(12) United States Patent  (10) Patent No.: US 9,403,435 B2
Bejcek  (45) Date of Patent: Aug. 2, 2016

(54) ADJUSTABLE GROUND SPEED CONTROL DEVICES, SYSTEMS, AND METHODS FOR WALK-BEHIND EQUIPMENT

(71) Applicant: Honda Motor Co., Ltd., Tokyo (JP)

(72) Inventor: Andrew E. Bejcek, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 14/514,324

(22) Filed: Oct. 14, 2014

(65) Prior Publication Data

US 2016/0101693 A1    Apr. 14, 2016

(51) Int. Cl.
*B60T 8/32* (2006.01)
*B60K 26/02* (2006.01)

(52) U.S. Cl.
CPC .............. *B60K 26/02* (2013.01); *B60K 26/021* (2013.01); *B60K 2026/022* (2013.01); *B60K 2026/025* (2013.01); *B60Y 2300/188* (2013.01)

(58) Field of Classification Search
CPC ..... A01D 34/6806; A01D 34/00; B62D 51/04
USPC ........... 701/93; 180/19.1, 19.3; 56/10.8, 14.7, 56/16.7, 10.9, 11.3, 11.8
See application file for complete search history.

(56) References Cited

U.S. PATENT DOCUMENTS

| | | | |
|---|---|---|---|
| 4,900,881 A | 2/1990 | Fischer | |
| 5,245,144 A | 9/1993 | Stammen | |
| 5,511,367 A | 4/1996 | Powers et al. | |
| 5,848,520 A | 12/1998 | Arfstrom et al. | |
| 6,082,083 A | 7/2000 | Stalpes et al. | |
| 6,389,630 B1 | 5/2002 | Chen | |
| 6,644,002 B2 | 11/2003 | Trefz | |
| 6,945,133 B2 | 9/2005 | Rush et al. | |
| 7,063,177 B1 * | 6/2006 | Crumly | A01D 34/6806 180/19.1 |
| 7,146,787 B2 | 12/2006 | Walker | |
| 7,213,662 B2 | 5/2007 | Crumly | |
| 7,275,615 B2 | 10/2007 | Derby et al. | |
| 7,383,915 B2 | 6/2008 | David et al. | |
| 7,458,432 B2 | 12/2008 | Mayer et al. | |
| 7,478,689 B1 | 1/2009 | Sugden et al. | |
| 7,523,795 B2 | 4/2009 | Velke et al. | |
| 7,540,131 B2 | 6/2009 | Stover et al. | |
| 7,591,323 B2 | 9/2009 | Wynings | |
| 7,647,754 B2 | 1/2010 | Velke et al. | |
| 8,572,940 B2 | 11/2013 | Schmidt et al. | |
| 8,660,744 B2 | 2/2014 | Derby et al. | |
| 8,783,391 B2 * | 7/2014 | Porter | B62D 11/006 180/6.32 |

(Continued)

*Primary Examiner* — Luke Huynh
(74) *Attorney, Agent, or Firm* — Jenkins, Wilson, Taylor & Hunt, P.A.

(57) ABSTRACT

The present subject matter relates to adjustable ground speed control devices, systems, and methods for walk-behind equipment. A variable speed control system for a machine can include a control system base, one or more control lever selectively movable with respect to the control system base between a first operating position and a second operating position, first and second speed adjustment actuators positioned on the control system base proximal to the one or more control lever, and a control unit configured for communication with the one or more control lever, the first and second speed adjustment actuators, and a machine component. In this configuration, the one or more control lever can be configured to control the machine component to operate between a minimum operating speed and a variable maximum operating speed, where the value of the variable maximum operating speed can be adjusted by the first and second speed adjustment actuators.

20 Claims, 4 Drawing Sheets

(56) References Cited

U.S. PATENT DOCUMENTS

| | | | |
|---|---|---|---|
| 9,163,707 B2 * | 10/2015 | Helin | A01D 34/6806 |
| 9,185,843 B2 * | 11/2015 | Kaskawitz | A01D 34/6806 |
| 2002/0019277 A1 | 2/2002 | Kaesgen | |
| 2011/0108335 A1 | 5/2011 | Levander et al. | |
| 2013/0081500 A1 | 4/2013 | Helin et al. | |

* cited by examiner

ADJUSTABLE GROUND SPEED CONTROL DEVICES, SYSTEMS, AND METHODS FOR WALK-BEHIND EQUIPMENT

TECHNICAL FIELD

The subject matter disclosed herein relates generally to variable control systems for powered equipment. More particularly, the subject matter disclosed herein relates to variable speed controls and methods for walk-behind working machines, such as lawnmowers.

BACKGROUND

Many walk-behind working machines, such as lawnmowers and other similar small powered equipment, have a self-propel system that propels or drives the working machine at a selected ground speed. In such systems, a control system is typically carried on the handle to allow the operator to engage and disengage the self-propel system and to select a desired ground speed. For example, many such control systems use a pivotable ground speed control bail on the handle of the working machine. Generally, self propelled drive systems can be divided into two categories: single/multiple speed, and variable speed. In single/multiple speed drive systems, the ground speed is fixed by one or more gear ratios, and it can only be adjusted by selecting a different gearset (if available). In contrast, variable speed drive systems allow the operator the ability to "infinitely" adjust the ground speed of the lawn mower, such as by a slipping belt system where the belt tension is varied, a slipping clutch system where the clutch pressure is varied, a hydrostatic transmission where a swash plate angle is variable, or an electric drive system where the electric power supply is switched.

Even in such variable speed drive systems, however, the maximum operating speed is either fixed or, if variable, cumbersome to change while the working machine is being operated. Specifically, in all currently available adjustable control drive systems, the maximum speed setting is made by a mechanical lever, rotary knob, or mechanical latching device. In such configurations, an operator must remove at least one of his hands from the control handle to make any adjustments to the maximum operating speed. Accordingly, making such adjustments can result in the operator at least partially losing some degree of control over the working machine. In view of these issues, it would be desirable for a ground speed control system to allow for adjustment of the maximum speed setting of the working machine without diminishing the operator's ability to control the working machine.

SUMMARY

In accordance with this disclosure, adjustable ground speed control devices, systems, and methods for walk-behind equipment are provided. In one aspect, a variable speed control system for a walk-behind working machine is provided. The variable speed control system can include a control system base, one or more control lever that is selectively movable with respect to the control system base between a first operating position and a second operating position, first and second speed adjustment actuators positioned on the control system base proximal to the one or more control lever, and a control unit configured for communication with the one or more control lever, the first and second speed adjustment actuators, and a machine component. In this configuration, the control unit can be configured to selectively control the operation of the machine component between a minimum operating speed and a variable maximum operating speed, the variable maximum operating speed having a variable value, where the first speed adjustment actuator can be configured to increase the value of the variable maximum operating speed (e.g., up to a system maximum speed), and the second speed adjustment actuator can be configured to decrease the value of the variable maximum operating speed. The one or more control lever can be configured to control the machine component to operate at the minimum operating speed when the one or more control lever is in the first angular position, and the one or more control lever can be configured to control the machine component to operate at the variable maximum operating speed when the one or more control lever is in the second angular position.

In another aspect, a method for varying a speed of a walk-behind working machine is provided. The method can include moving one or more control lever with respect to a control system base between a first operating position and a second operating position and, without releasing the one or more control lever, selectively actuating one of a first speed adjustment actuator or a second speed adjustment actuator positioned on the control system base proximal to the one or more control lever. In this way, pivoting the one or more control lever to the first operating position can control a machine component to operate at a minimum operating speed, whereas pivoting the one or more control lever to the second operating position can control the machine component to operate at a variable maximum operating speed, wherein a value of the variable maximum operating speed is variable. Further, actuating the first speed adjustment actuator can increase the value of the variable maximum operating speed, and actuating the second speed adjustment actuator can decrease the value of the variable maximum operating speed.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides variable speed control systems and methods for walk-behind working machines, such as lawnmowers and similar powered machines. In one aspect, the present subject matter provides variable speed control systems and methods that can vary speed, comfortably hold a fixed speed, and vary the maximum speed at which the working machine is operated.

Figure 1A:
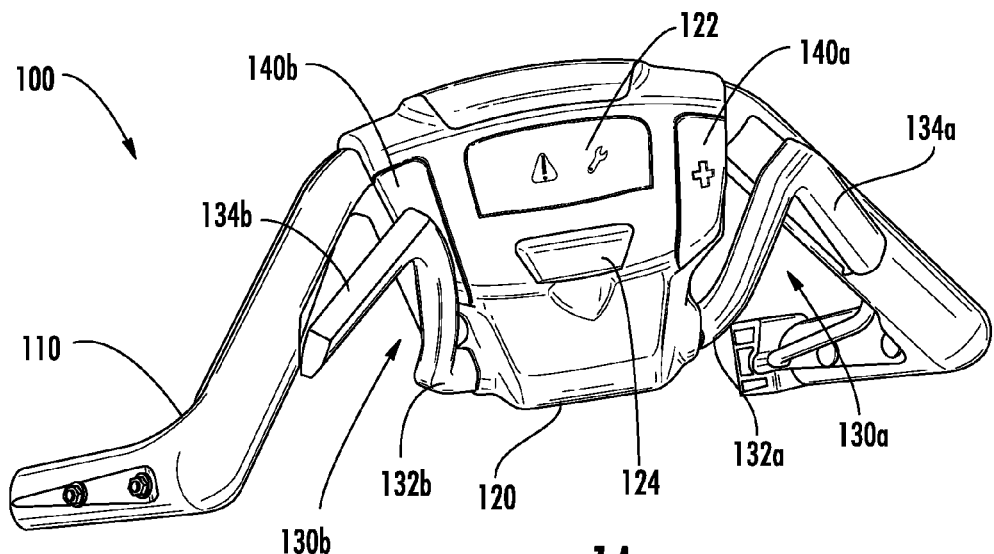
FIG. 1a is a perspective view of a variable speed control system in a first operating position according to an embodiment of the presently disclosed subject matter.
Figure 1B:
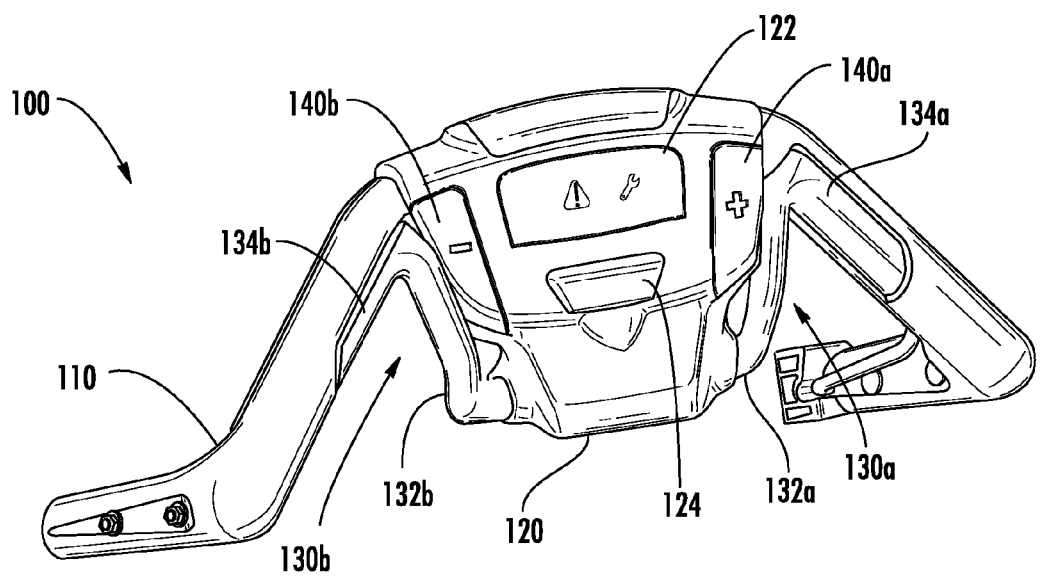
FIG. 1b is a perspective view of a variable speed control system in a second operating position according to an embodiment of the presently disclosed subject matter.
Figure 2:
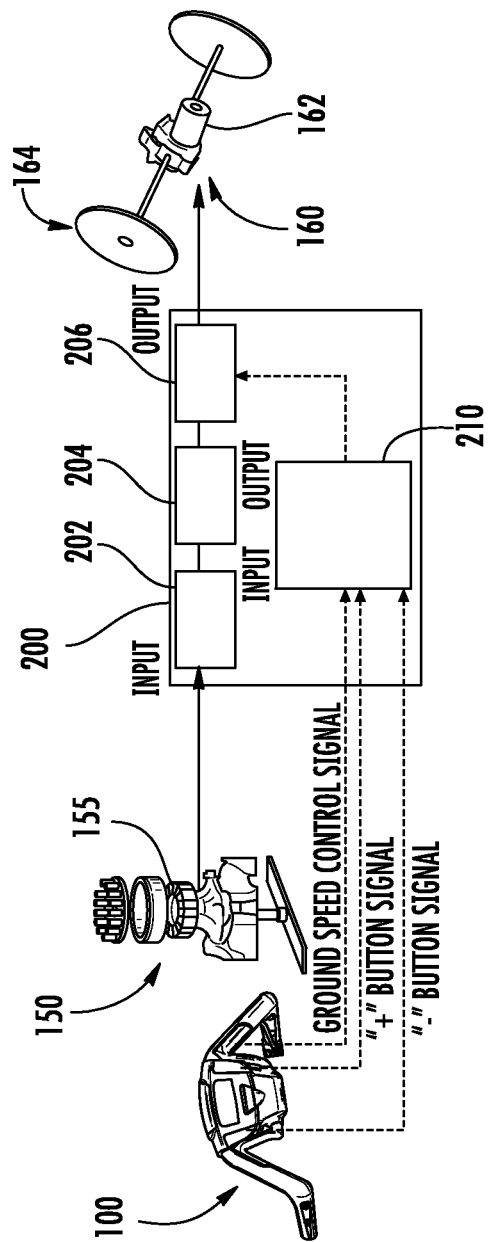
FIG. 2 is a schematic representation of a drive system for a self-propelled machine according to an embodiment of the presently-disclosed subject matter.

Specifically, for instance, as shown in FIGS. 1a through 2, a variable speed control system, generally designated 100 can comprise a handle 110 configured to be gripped by an operator to control the operation of a working machine, such as a lawnmower or other small powered machine, to which handle 110 is connected. A control system base 120 can be attached to or otherwise positioned near handle 110. A display 122 can be provided on control system base 120 to provide warnings or other indications of the operating state of the working machine, and an engine engagement control 124 (e.g., a push-button starter). A pair of control levers, generally designated 130a and 130b, can be movably attached to control system base 120. With this general configuration, control levers 130a and 130b can be moved to control operation of a machine component, such as for example a variable transmission for a self-propel system of the working machine.

In particular, a first control lever 130a can comprise a first lever arm 132a having a first end that is pivotably attached to control system base 120 (e.g., about a pivot axis that extends through control system base 120) and a second end substantially opposing the first end that comprises a first grip portion 134a. Likewise, a second control lever 130b can comprise a second lever arm 132b having a first end that is pivotably attached to control system base 120 and a second end substantially opposing the first end that comprises a second grip portion 134b. Specifically, for example, as shown in FIGS. 1a and 1b, each of first and second control levers 130a and 130b can have a substantially L-shaped profile, with first and second grip portions 134a and 134b extending at a non-zero angle (e.g., between about 50 and 90 degrees) away from first and second lever arms 132a and 132b, respectively. This angular arrangement allows the operator to grab one or both of first or second grip portions 134a or 134b in a comfortable hand position and pivot first and second control levers 130a and/or 130b with respect to control system base 120. In some embodiments, first and second lever arms 132a and 132b can be coupled for rotation together, whereby pivoting of one of first or second lever arms 132a or 132b (e.g., by pressing on a respective one of first and second grip portions 134a or 134b) causes a corresponding movement of the other. Alternatively, first and second lever arms 132a and 132b can be independently movable with respect to control system base 120 such that the operation of either (or both) of first and second lever arms 132a and 132b can be moved to control operation of a machine component.

In this regard, to control the operation of the associated machine component (e.g., a self-propel system), first and second control levers 130a and 130b can be selectively pivoted with respect to control system base 120 between a first angular position (See, e.g., FIG. 1a) at which first and second grip portions 134a and 134b of first and second control levers 130a and 130b are spaced apart from handle 110 and a second angular position (See, e.g., FIG. 2b) at which first and second grip portions 134a and 134b are drawn against handle 110. Further in this regard, in some embodiments, when in the second position, at least a portion of each of first and second grip portions 134a and 134b is positioned within a recess that is formed in an edge of handle 110.

In any configuration, the movement of first and second control levers 130a and 130b between the first and second angular position can involve pivoting the control lever through a limited angular range (e.g., about 35 degrees) such that the movement of first and second control levers 130a and 130b can be comfortably performed by the operator without letting go of handle 110. In other words, while the operator is holding handle 110 to steer or otherwise control the working machine, the operator can extend his/her thumbs and/or palms backwards a short distance (e.g., about 71 mm) to grab one or both of first and second grip portions 134a and 134b while keeping his/her other fingers on handle 110.

Further in this regard, a first speed adjustment actuator 140a and a second speed adjustment actuator 140b can also be provided on control system base 120. First and second speed adjustment actuators 140a and 140b can be used in combination with first and second control levers 130a and 130b to further control the operating state of the working machine. In the configuration shown in FIGS. 1a and 1b, for example, first and second speed adjustment actuators 140a and 140b can comprise push buttons positioned proximal to first and second control levers 130a and 130b, respectively. In this arrangement, an operator can easily reach and depress the push buttons while holding handle 110 and/or first and second control levers 130a and 130b. In particular, first and second speed adjustment actuators 140a and 140b can be positioned adjacent to a natural thumb position of an operator when the operator is manipulating first and second control levers 130a and 130b. In the configuration shown in FIGS. 1a and 1b, for example, such a positioning results in first speed adjustment actuator 140a being positioned at or near a right-most edge of control system base 120 such that it is near to first control lever 130a, and second speed adjustment actuator 140b is positioned at or near a left-most edge of control system base 120 such that it is near to second control lever 130b. Alternatively, first and second speed adjustment actuators 140a and 140b can be provided in any of a variety of other forms, including by not limited to a tactile switch, a capacitance sensor, a membrane with capacitance sensing, or any other device that is sensitive to touch. In any configuration, variable speed control system 100 can be designed to be easily manipulated while the operator maintains overall control of the working machine.

In operation, where the machine component is a self-propel system for a working machine, moving first and second control levers 130a and 130b to the first angular position can control the machine to be in a first operating state, which can be a minimum operating speed or a disengaged state (i.e., no torque applied). Conversely, upon movement of first and second control levers 130a and 130b to the second angular position, the machine component can be controlled to be in a second operating state. Again, for instance, where the machine component is a self-propel system for a working machine, the second operating state can be a fully engaged or high speed state (i.e., torque applied to the drive system such that the working machine is moved at a selected cruising speed).

Furthermore, those having skill in the art will recognize that first and second control levers 130a and 130b can additionally be pivoted to any of a variety of intermediate angular positions to correspondingly operate the machine component in one or more partial engagement states (e.g., low- to medium-speed operating states of the self-propel system). In this way, the operator can selectively operate the machine component at states between the first and second operating states. For example, where the machine component is a self-propel system, positioning first and second control levers 130a and 130b at a selected intermediate position can control the self-propel system to operate at a speed that is proportional to the relative angular travel of first and second control levers 130a and 130b between the first and second operating states. At any position, however, first and second control levers 130a and 130b can be configured to be comfortably held and manipulated by the operator while maintaining a grip on handle 110.

Furthermore, first and second speed adjustment actuators 140a and 140b can provide additional control over the range of operating states available. In particular, first and second speed adjustment actuators 140a and 140b can be configured to adjust the value of a parameter of the output at the second operating state of the machine component. Again, in the case where the machine component is a self-propel system for a working machine, for example, this adjustment allows the maximum operating speed setting of the self-propel system to be adjusted based on the preferences of the operator.

In one embodiment, for example, first speed adjustment actuator 140a can be operable to change the maximum operating speed setting of the self-propel system to have an incrementally higher value, whereas second speed adjustment actuator 140b can be operable change the maximum operating speed setting of the self-propel system to have a decrementally lower value. In this way, fine adjustments of the maximum operating speed setting of the working machine can be made without diminishing the operator's ability to control the working machine.

The control inputs from first and second control levers 130a and 130b and first and second speed adjustment actuators 140a and 140b can then be communicated to the operation of the working machine. In some embodiments, for example, the working machine can utilize a hybrid system, such as is illustrated in FIG. 2, in which the working element (e.g., a blade when working machine is a lawn mower) is driven by a combustion engine, generally designated 150, and the self propelled drive system, generally designated 160, is driven by an electric motor 162 that is configured to supply power to one or more wheels 164 of the self-propelled machine at a selected forward ground speed. Drive system 160 can be mechanically driven by engine 150 directly, or as shown in FIG. 2, drive system 160 can be electrically driven, and the operation of drive system 160 can be controlled by the operation of a control unit 200 (e.g., an electronic control unit (ECU)) that is in communication with both engine 150 and variable speed control system 100.

In some aspects, for example, drive system 160 can comprise an electric transmission, and electric motor 162 can be an electric transmission motor that is powered using an electrical actuator or generator 155 or any other type of rotating object (and/or a battery where engine 150 is not running). In some aspects, electrical actuator or generator 155 can be coupled and/or mounted onto a crankshaft of engine 150. Electric motor 162 can be adapted to directly power drive system 160, and drive system 160 can be adapted to transfer and/or supply power directly to the one or more wheels 164 of the self-propelled machine.

As discussed above, variable speed control system 100 can be configured to be operable by an operator to select a desired ground speed of the self-propelled machine. In particular, the desired ground speed can be selectively chosen by the operator through manipulation of variable speed control system 100, such as by moving first and second control levers 130a and 130b to any of a range of operating positions corresponding to one of a predetermined range of desired ground speeds. This operability advantageously allows an operator to choose a ground speed that best suits the terrain and/or the operator's mobility, among other factors. Furthermore, the value of the cruising/maximum operating speed corresponding to the second angular position of first and second control levers 130a and 130b (i.e., fully-depressed against handle 110) can be adjusted up or down by operating first and second speed adjustment actuators 140a and 140b. In this way, users who desire to operate the self-propelled machine at lower speeds do not need to carefully hold first and second control levers 130a and 130b at an unstable intermediate operating position between the fully disengaged and fully engaged states. Rather, such users can simply change the maximum operating speed setting using first and second speed adjustment actuators 140a and 140b, and then move first and second control levers 130a and 130b to the fully engaged position. This adjustability thus allows the operator to pick a maximum operating speed that can be easily and consistently achieved without continuously adjusting the position of first and second control levers 130a and 130b.

In this way, the desired ground speed can be selected by the operator, with variable speed control system 100 being configured to transmit the selected desired ground speed, in the form of a signal or pulse, to drive system 160 via control unit 200. For example, variable speed control system 100 can be configured to transmit an electrical signal or pulse (e.g. a control signal) to control unit 200 by way of an electrical sensor. Variable speed control system 100 can alternatively be configured to transmit a digital or analog signal to control unit 200, while other alternative means of communication can also be utilized. In one aspect, the control signal can communicate the desired ground speed to control unit 200 essentially as a ratio of the desired ground speed compared to a system maximum ground speed setting (e.g., which can be equal to or greater than the user-defined maximum operating speed setting controlled by first and second speed adjustment actuators 140a and 140b). Under normal operating conditions, control unit 200 can be configured to control drive system 160 to drive the self-propelled machine at the desired ground speed selected by way of variable speed control system 100.

Control unit 200 can correspondingly be configured to receive the control signal from variable speed control system 100. Based at least partly on this input, control unit 200 can transmit power to drive system 160 via electric motor 162, thereby controlling the transmission speed or actual ground speed of the self-propelled machine (e.g., by driving wheels 164). For example, control unit 150 can be configured so that the control signal can be transmitted as a signal or pulse to a microcontroller 210. In one aspect, engine power can be communicated to control unit 200 as alternating current or AC power. Where engine 150 is configured to communicate AC power to control unit 200, then control unit 200 must convert AC power to DC power before reaching electric motor 162. In one aspect, for example, engine 150 transmits power to a rectifier 202 or any other device that converts alternating current (AC) to direct current (DC). After power has been converted from AC power to DC power, a DC power bus 204 can communicate said power in the form of a signal or pulse to a power delivery system, generally designated 206, in order to control the power supplied to electric motor 162. Power delivery system 206 can comprise that of a pulse width modulator or (PWM), a potentiometer, or a rheostat.

Figure 3:
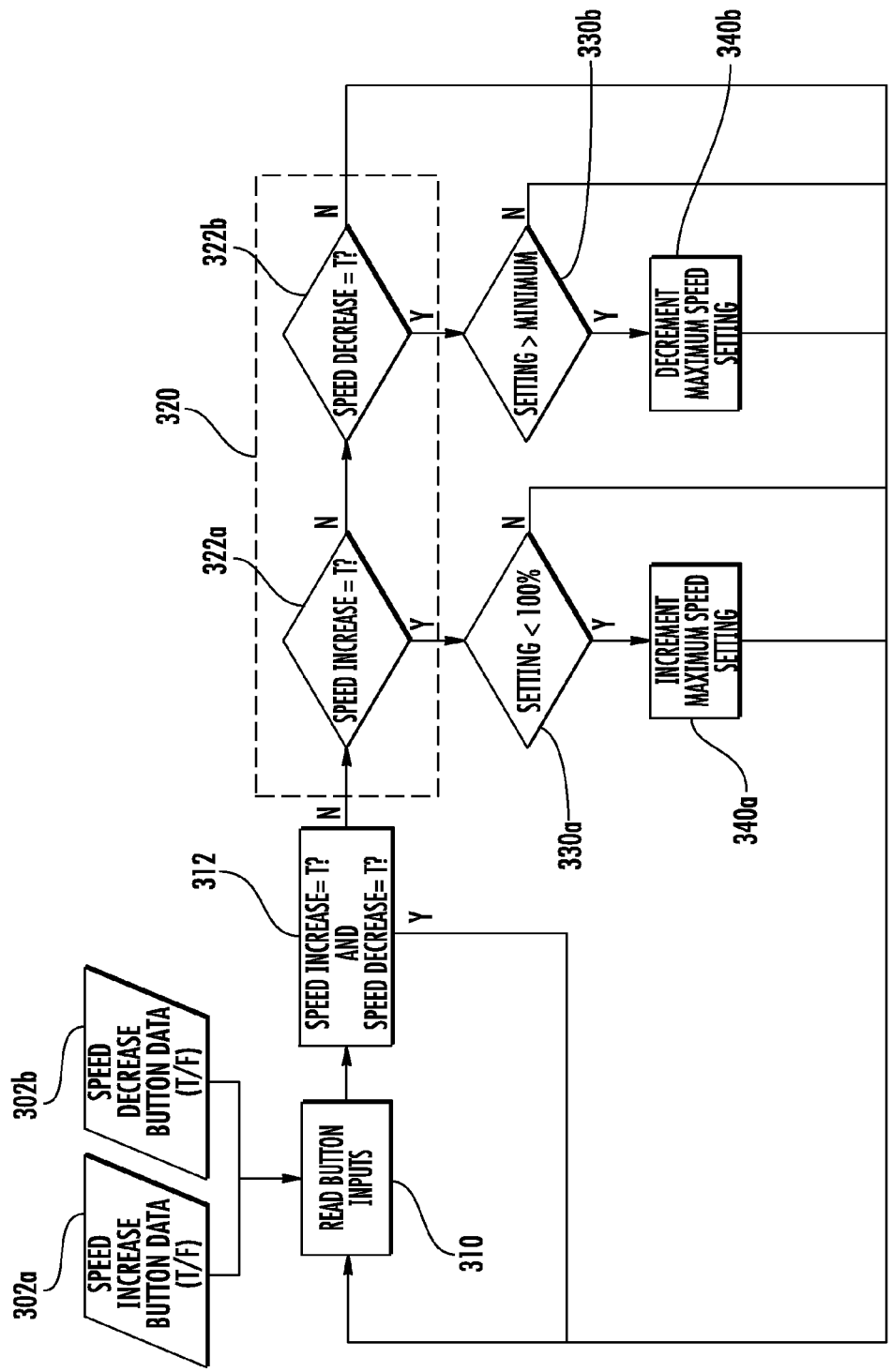
FIG. 3 is a block diagram illustrating a system for adjusting a maximum operating speed of a self-propelled machine according to one aspect of the subject matter described herein.

In one particular configuration, for example, the control inputs from first and second speed adjustment actuators 140a and 140b can be communicated to and interpreted by control unit 200 in the process shown in FIG. 3. As illustrated in FIG. 3, actuation of first speed adjustment actuator 140a can communicate a speed increase signal 302a to control unit 200, whereas actuation of second speed adjustment actuator 140b can communicate a speed decrease signal 302b to control unit 200. An input reception step 310 can thus include control unit 200 receiving these inputs, and a comparison step 320 can include identifying whether one of speed increase signal 302a or speed decrease signal 302b is being communicated. Specifically, control unit 200 can test whether a speed increase is requested (e.g., in a speed increase comparison step 322a) or a speed decrease is requested (e.g., in a speed decrease comparison step 322b). In some embodiments, a double-input check 312 can be performed before comparison step 320 to avoid unnecessary changes in the maximum operating speed setting when both of first and second speed adjustment actuators 140a and 140b are operated simultaneously.

When only a single input is provided, however, if a speed increase is requested (i.e., speed increase comparison step 322a returns a true value), control unit 200 can further determine whether increasing the maximum operating speed setting would cause the system to exceed a system maximum setpoint (e.g., manufacturer-set maximum speed) in a maximum comparison step 330a. If an increase would not exceed the system maximum setpoint, a speed increment step 340a can increase the maximum operating speed setting. If the maximum operating speed setting already equals the system maximum setpoint, no change is made.

Alternatively, if a speed decrease is requested (i.e., speed decrease comparison step 322b returns a true value), control unit 200 can further determine whether decreasing the maximum operating speed setting would cause the system to fall below an established system minimum setpoint in a minimum comparison step 330b. If a decrease would not bring the system below this value, a speed decrement step 340b can decrease the maximum operating speed setting. If the maximum operating speed setting is already at the system minimum setpoint, no change is made.

Figure 4:
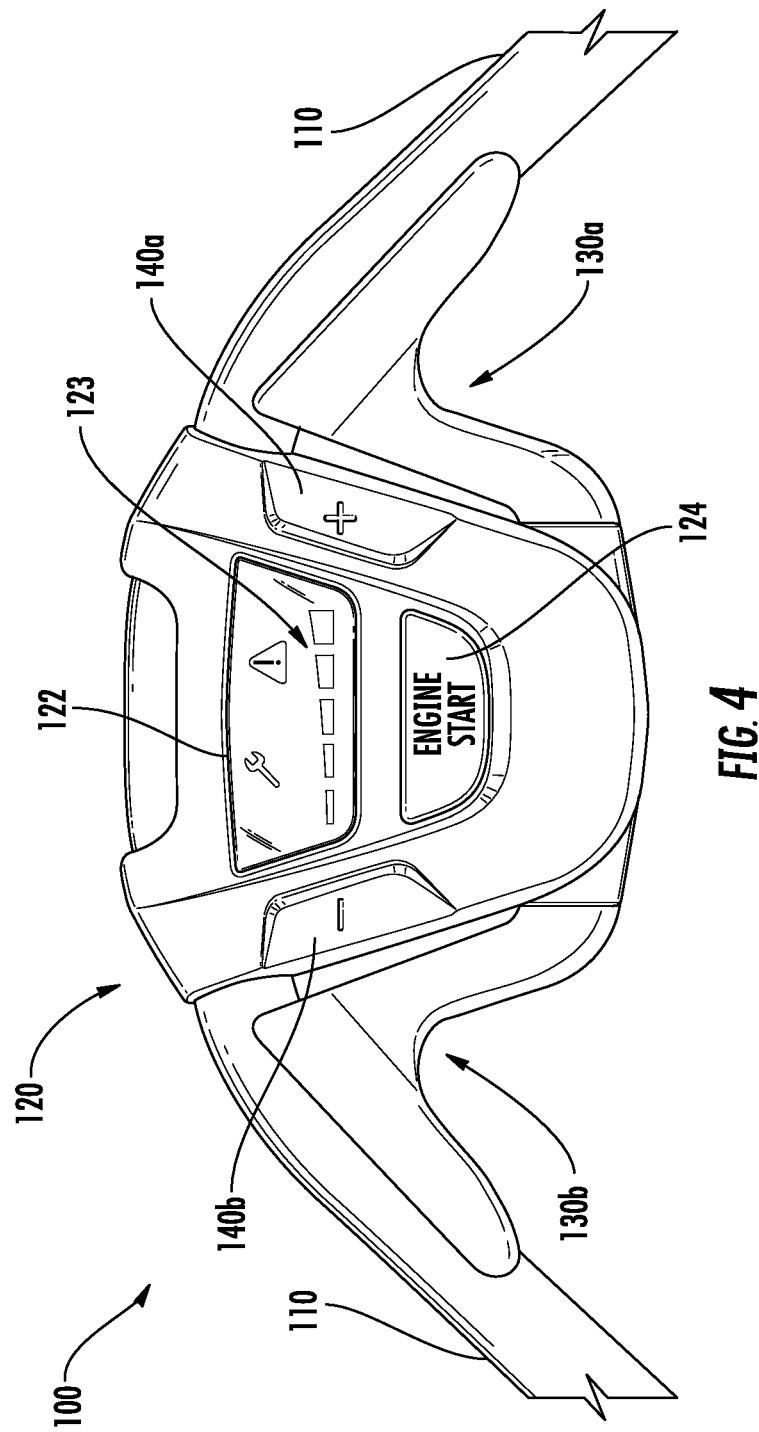
FIG. 4 is a front view of a variable speed control system according to an embodiment of the presently disclosed subject matter.

The maximum operating speed established by this or by another process can be displayed to the operator to identify the current setpoint at which the working machine is operating and to provide visual feedback to the operator with respect to how the actuation of first and second speed adjustment actuators 140a and 140b affect the maximum operating speed setting. As shown in FIG. 4, for example, a speed setting indicator 123 can be provided on display 122 to graphically indicate the current setpoint of the maximum operating speed within the range of possible values (e.g., between a system minimum setpoint and a system maximum setpoint discussed above). In this regard, speed setting indicator 123 can be provided as one of an LED display, and LCD display, an array of indicator lights, or any of a variety of other display devices known to those having skill in the art as being able to convey a value and/or relative speed setting within a given range.

In some aspects, the subject matter described herein may be implemented in software in combination with hardware and/or firmware. For example, the subject matter described herein may be implemented in software executed by a processor (e.g., a hardware-based processor), microprocessor, and/or microcontroller of the electronic control unit. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, logic devices, logic transistors, chip memory devices, programmable logic devices, such as field programmable gate arrays, and application specific integrated circuits. In addition, a computer readable medium that implements the subject matter described herein may be located on a single device or computing platform or may be distributed across multiple devices or multiple computing platforms.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A variable speed control system for a walk-behind working machine, the system comprising:
   a control system base;
   one or more control lever selectively movable with respect to the control system base between a first operating position and a second operating position;
   first and second speed adjustment actuators positioned on the control system base proximal to the one or more control lever; and
   a control unit configured for communication with the one or more control lever, the first and second speed adjustment actuators, and a machine component;
   wherein the control unit is configured to selectively control the operation of the machine component between a minimum operating speed and a variable maximum operating speed;
   wherein the first speed adjustment actuator is configured to communicate with the control unit to increase a value of the variable maximum operating speed;
   wherein the second speed adjustment actuator is configured to communicate with the control unit to decrease the value of the variable maximum operating speed; and
   wherein the one or more control lever is configured to communicate with the control unit to control the machine component to operate at the minimum operating speed when the one or more control lever is in the first operating position, and wherein the one or more control lever is configured to control the machine component to operate at the variable maximum operating speed when the one or more control lever is in the second operating position.

2. The variable speed control system of claim 1, wherein the machine component comprises a variable transmission for a self-propel system of the working machine;
   wherein the minimum operating speed comprises a disengaged state of the machine component; and
   wherein the variable maximum operating speed comprises operation of the self-propel system at a cruising speed defined by the value of the variable maximum operating speed.

3. The variable speed control system of claim 1, wherein the one or more control lever comprises:
   a first control lever selectively movable with respect to a first side of the control system base, wherein the first speed adjustment actuator is positioned proximal to the first control lever; and
   a second control lever selectively movable with respect to a second side of the control system base, wherein the second speed adjustment actuator is positioned proximal to the second control lever.

4. The variable speed control system of claim 3, wherein the first control lever and the second control lever are coupled for movement together with respect to the control system base.

5. The variable speed control system of claim 1, wherein the first and second speed adjustment actuators each comprise a device selected from the group consisting of a push button, a tactile switch, a capacitance sensor, and a membrane with capacitance sensing.

6. The variable speed control system of claim 1, wherein the control unit is configured to selectively control the operation by controlling a power delivery system connected to the machine component.

7. A variable speed control system for a walk-behind working machine, the system comprising:
   a control system base;
   first and second control levers selectively pivotable with respect to the control system base between a first angular position and a second angular position;
   a first speed adjustment actuator positioned on the control system base proximal to the first control lever;
   a second speed adjustment actuator positioned on the control system base proximal to the second control lever;
   a control unit configured for communication with the first and second control levers, the first and second speed adjustment actuators, and a machine component;
   wherein the control unit is configured to selectively control the operation of the machine component between a minimum operating speed and a variable maximum operating speed;
   wherein the first speed adjustment actuator is configured to communicate with the control unit to increase a value of the variable maximum operating speed;
   wherein the second speed adjustment actuator is configured to communicate with the control unit to decrease the value of the variable maximum operating speed; and
   wherein the first and second control levers are configured to communicate with the control unit to control the machine component to operate at the minimum operating speed when at least one of the first and second control levers is in the first angular position, and wherein the first and second control levers are configured to control the machine component to operate at the variable maximum operating speed when at least one of the first and second control levers is in the second angular position.

8. The variable speed control system of claim 7, wherein the machine component comprises a variable transmission for a self-propel system of the working machine;
   wherein the minimum operating speed comprises a disengaged state of the machine component; and
   wherein the variable maximum operating speed comprises operation of the self-propel system at a cruising speed defined by the value of the variable maximum operating speed.

9. The variable speed control system of claim 7, wherein the first control lever and the second control lever are coupled for movement together with respect to the control system base.

10. The variable speed control system of claim 7, wherein the first and second speed adjustment actuators each comprise a device selected from the group consisting of a push button, a tactile switch, a capacitance sensor, and a membrane with capacitance sensing.

11. The variable speed control system of claim 7, wherein the control unit is configured to selectively control the operation by controlling a power delivery system connected to the machine component.

12. A method for varying a speed of a walk-behind working machine, the method comprising:
   moving one or more control lever with respect to a control system base between a first operating position and a second operating position;
   without releasing the one or more control lever, selectively actuating one of a first speed adjustment actuator or a second speed adjustment actuator positioned on the control system base proximal to the one or more control lever;
   wherein moving the one or more control lever to the first operating position controls a machine component to operate at a minimum operating speed;
   wherein moving the one or more control lever to the second operating position controls the machine component to operate at a variable maximum operating speed;
   wherein actuating the first speed adjustment actuator increases the value of the variable maximum operating speed; and
   wherein actuating the second speed adjustment actuator decreases the value of the variable maximum operating speed.

13. The method of claim 12, wherein the machine component comprises a variable transmission for a self-propel system of the working machine;
   wherein controlling the machine component to operate at the minimum operating speed comprises operating the machine component in a disengaged state; and
   wherein controlling the machine component to operate at the variable maximum operating speed comprises operating the self-propel system at a cruising speed defined by the value of the variable maximum operating speed.

14. The method of claim 12, wherein moving one or more control lever with respect to a control system base comprises pivoting a lever arm of at least one of the one or more control lever, the lever arm being pivotably coupled to the control system base;
   wherein moving the one or more control lever to the first operating position comprises pivoting the lever arm to a first angular position relative to the control system base; and
   wherein moving the one or more control lever to the second operating position comprising pivoting the lever arm to a second angular position relative to the control system base.

15. The method of claim 12, wherein actuating one of a first speed adjustment actuator or a second speed adjustment actuator comprises pushing a push button or touching one of a tactile switch, a capacitance sensor, or a membrane with capacitance sensing.

16. The method of claim 12, wherein moving the one or more control lever with respect to a control system base comprises moving at least one of a first control lever selectively movable with respect to a first side of the control system base or a second control lever selectively movable with respect to a second side of the control system base; and
   wherein selectively actuating one of a first speed adjustment actuator or a second speed adjustment actuator comprises selectively activating one of the first speed adjustment actuator positioned proximal to the first control lever or the second speed adjustment actuator positioned proximal to the second control lever.

17. The method of claim 16, wherein the first control lever and the second control lever are coupled together; and
   wherein moving at least one of the first control lever or the second control lever results in both of the first control lever and the second control lever being moved with respect to the control system base.

18. The method of claim 12, wherein actuating the first speed adjustment actuator comprises comparing the value of the variable maximum operating speed to a system maximum setpoint; and increasing the value of the variable maximum operating speed by an increment if the value of the variable maximum operating speed is less than the system maximum setpoint.

19. The method of claim 12, wherein actuating the second speed adjustment actuator comprises comparing the value of the variable maximum operating speed to a system minimum setpoint; and decreasing the value of the variable maximum operating speed by a decrement if the value of the variable maximum operating speed is greater than the system minimum setpoint.

20. The method of claim 12, wherein moving one or more control lever with respect to a control system base between a first operating position and a second operating position varies an output of a power delivery system connected to the machine component.

* * * * *